March 15, 1960 A. HERLET 2,929,006

JUNCTION TRANSISTOR

Filed Nov. 25, 1955

United States Patent Office 2,929,006

Patented Mar. 15, 1960

2,929,006

JUNCTION TRANSISTOR

Adolf Herlet, Pretzfeld, Bavaria, Germany, assignor to Siemens-Schuckertwerke Aktiengesellschaft, Berlin-Siemensstadt and Erlangen, Germany, a corporation of Germany Application November 25, 1955, Serial No. 548,923

Claims priority, application Germany December 2, 1954

15 Claims. (Cl. 317—235)

My invention relates to junction or broad-area transistors and has for its object to improve the operating capacity of such transistors.

For best operation of a transistor, it is essential that the mutual spacing between all electrodes be as small as possible. Particularly the two directing electrodes, namely the emitter and the collector, should be close to each other along largest possible portions of their respective areas. For that reason the two directing electrodes have been mounted on the two opposite broad sides, and the base electrode has been mounted on one of the narrow sides of a flat transistor body. As a result, however, there occur undesirably large path lengths between portions of the emitter and collector electrodes on the one hand and the base electrode on the other hand. In another known transistor, the base electrode is arranged on one of the two broad sides of the wafer-shaped transistor body, whereas the emitter and collector electrodes, both subdivided, are disposed at the other broad side on a number of surface areas located beside each other in an alternating sequence. The component parts of the two directing electrodes are very close to each other at their respective edges as required for proper operation; but the electrode points closer to the centers of the individual electrode parts can hardly become effective because the path lengths between them are a multiple of the spacing between the respective edges.

It is therefore a more specific object of my invention to improve the spacial conditions to thereby achieve an increased utilization of a transistor of given overall dimensions.

To this end, and in accordance with my invention, a junction transistor of semiconductor material having the base electrode mounted on one broad side of the semiconductor body and the directing electrodes located beside each other on the opposite broad side, is so designed that the individually subdivided directing electrodes are located in recesses of the semi-conductor body and are placed upon surface areas of the recesses that extend transverse to the plane of the broad side, preferably on parts of the inner recess surfaces that are substantially perpendicular to that plane.

Figure 1:
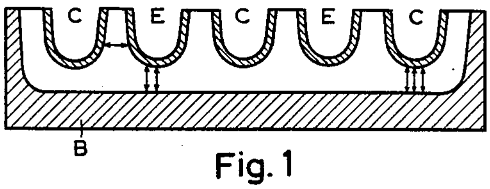
Figure 2:
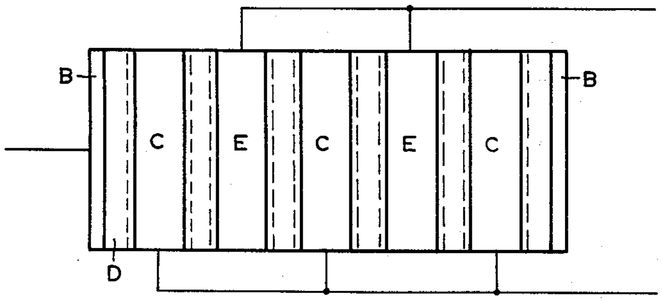

Embodiments of junction transistors according to the invention are schematically illustrated in the drawing on a greatly enlarged scale. Fig. 1 shows a cross-section, Fig. 2 a top view, and Fig. 3 a top view of a somewhat modified form of a transistor.

The transistor comprises a flat monocrystalline semiconductor body D of germanium. Other semiconductor substances, such as silicon or semiconducting compounds of respective elements from the third and fifth group of the periodic system, are likewise applicable. For the purpose of referring in the following to specific electrode materials and doping substances, it is assumed that in the illustrated embodiment of the main body of semiconducting material consists of high-ohmic n-type germanium.

Figure 3:
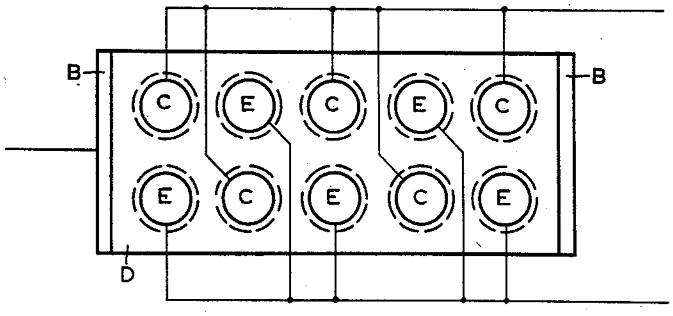

Located on the lower broad side of the semi-conductor body D (Fig. 1) is the base electrode B consisting, for instance, of antimony or an alloy of antimony, or another conducting material which comprises an element from the fifth group of the periodic system. The opposite side of the semi-conductor body D is provided with recesses. The emitter electrodes E or rather the individual parts thereof, as well as the parts of the subdivided collector electrode C are mounted in these recesses in an alternating sequence, one beside the other. The recesses may be designed as grooves cut into the semiconductor body D as exemplified by Fig. 2, or they may consist of bores as shown in Fig. 3. Instead of producing the recesses mechanically, they may also be produced by etching.

In order to produce the necessary p-n junction in the immediate vicinity of the respective directing electrodes, the originally n-conducting semiconductor body must be superficially modified into p-type conductance at the localities of the directing electrodes and preferably before these electrodes are joined with the semiconductor body. The conversion of the conductance type can be effected by alloying or diffusing a lattice-defect forming substance with or into the semi-conductor body.

One way of doing this is to first subject the entire surface of the semiconductor wafer, that is the surfaces of the recesses as well as the raised portions between the recesses, to a gaseous atmosphere which contains the doping substance, for instance aluminum, indium, or another element of the third group of the periodic system, in vaporous condition. By applying to the semiconductor body an elevated temperature within such an atmosphere, a surface layer is alloyed with the doping substance or absorbs the doping substance by diffusion thus forming a p-conducting layer.

Another way is to place the doping substance as a coherent coating onto the area for instance by vaporizing or atomizing it upon that area. Thereafter the coated semiconductor body is heated to an elevated temperature below the melting point of the doping substance with the effect that an amount of this substance will diffuse into the semiconductor body. Instead, the coated semiconductor body may be heated to a temperature somewhat above the melting point of the doping substance in order to form an alloy with the surface zone of the semiconductor.

After the above-described processing, the raised portions of the semiconductor are removed by etching, grinding or the like, until the original n-conducting material again appears at the surface of the raised areas, thus separating the doped areas located within the recesses. Thereafter, the inner surfaces of the recesses are contacted with electrode material such as aluminum or indium. All parts of the emitter electrode are then interconnected by a circuit lead or terminal, and all parts of the collector electrode are connected with another circuit lead or terminal.

A corresponding arrangement of the electrodes can be produced in a similar manner also for a fundamentally p-conducting semiconductor body. When using p-type germanium as the fundamental semiconductor body, the doping metal for the directing electrodes may consist of antimony for instance, and these electrodes may consist of, or contain, the same metal; and the base electrode may contain, or may consist of, aluminum or indium. Generally, for n- or p-type conductance of the fundamental semiconductor body, the electrodes may also consist of neutral metals, such as gold or gold alloys, to which the proper doping substance is added.

Not only for simplicity of manufacture but also for the desired electric improvement, it is preferable to also subject the area portions at the bottom of the recesses to conductance conversion by doping. Then the resulting spacing between the electrodes is as indicated in Fig. 1 by double-headed arrows. In practice, the amounts of spacing are preferably in the order of magnitude of 100 microns. These amounts of spacing are one of the determining factors for the volume of the semiconductor portion that remains in its original condition of conductance. It is apparent from Fig. 2 that the volume of the semiconductor portion remaining in the original condition, as well as each surface area portion that remains in such condition, is particularly small. As a result, the volume recombination and the surface recombination of the electric charge carriers (electrons and holes) is kept correspondingly small so that favorable transistor qualities are achieved.

The term "broad sides" refers to the two opposite major, large area faces, as distinguished from the edge surfaces of the plate or wafer.

It will be obvious to those skilled in the art, upon a study of this disclosure, that my invention is not exhausted by the specific examples mentioned in the foregoing and may be embodied in transistor designs and with the aid of materials and components other than those specifically described, without departing from the essence of the invention and within the scope of the claims annexed hereto.

I claim:

1. A junction transistor comprising a body of semiconductor material having opposite broad sides, the body having a plurality of recesses in one of its broad sides, each of said recesses having an inner surface area extending transversely to the geometric plane of said broad side, electrode material, forming hollowed out elements of a collector electrode, mounted in alternate recesses on the said inner transverse surfaces thereof, electrode material, forming hollowed out elements of an emitter electrode, mounted in alternate recesses on the inner transverse surfaces thereof, each of said elements having inner wall surface areas facing each other and extending transversely to the geometric plane of said broad side, a base electrode on the other broad side of the body, said other broad side being substantially planar, an electric conductor, connections therefrom to each of the collector electrode elements, a second electric conductor, connections therefrom to each of the emitter electrode elements.

2. The transistor defined in claim 1, the spacing between the recesses and between the bottoms of the recesses and the base electrode being in the order of magnitude of 100 microns.

3. A junction transistor comprising a body of semiconductor material having opposite broad sides, the body having a plurality of recesses comprising parallel grooves in one of its broad sides, each of said grooves having an inner surface area extending transversely to the geometric plane of said broad side, electrode material, forming hollowed out elements of a collector electrode, mounted in alternate grooves on the said inner transverse surfaces thereof, electrode material, forming hollowed out elements of an emitter electrode, mounted in alternate grooves on the inner transverse surfaces thereof, each of said elements having inner spaced apart wall surfaces facing each other and extending transversely to the geometric plane of said broad side, a base electrode on the other broad side of the body, said other broad side being planar, an electric conductor, connections therefrom to each of the collector electrode elements, a second electric conductor, connections therefrom to each of the emitter electrode elements.

4. The transistor defined in claim 3, and doping material, forming a p-n junction, in the areas of said body adjacent the inner surfaces of the grooves.

5. A junction transistor comprising a body of semiconductor material having opposite broad sides, the body having a plurality of cup shaped recesses in one of its broad sides, each of said recesses having an inner surface area extending transversely to the geometric plane of said broad side, electrode material, forming hollowed out elements of a collector electrode, lining the alternate recesses on the said inner transverse surfaces thereof, electrode material, forming hollowed out elements of an emitter electrode, lining the alternate recesses on the inner transverse surfaces thereof, each of said lining elements having inner wall surfaces facing each other and extending transversely to the geometric plane of said broad side, a base electrode on the other broad side of the body, said other broad side being planar, an electric conductor, connections therefrom to each of the collector electrode elements, a second electric conductor, connections therefrom to each of the emitter electrode elements.

6. The transistor defined in claim 5, and doping material, forming a p-n junction, in the areas of said body adjacent the inner surfaces of the recesses.

7. In a junction transistor according to claim 5, said recesses consisting of a multiplicity of circular holes extending through only part of the thickness of said body.

8. A junction transistor comprising a body of semiconductor material having opposite broad sides, the body having a plurality of recesses in one of its broad sides, the depth of the recesses being less than the thickness of the body, each of said recesses having an inner surface area extending transversely to the geometric plane of said broad side and having a bottom surface, doping material, forming a p-n junction, in the areas adjacent the transverse and bottom surfaces of the recesses, electrode material, forming hollowed out elements of a collector electrode, mounted in alternate recesses on the said inner transverse and bottom surfaces thereof, electrode material, forming hollowed out elements of an emitter electrode mounted in alternate recesses on the inner transverse and bottom surfaces thereof, each of said elements having inner wall surface areas facing each other and extending transversely to the geometric plane of said broad side, a base electrode on the other broad side of the body, said other broad side being planar, an electric conductor, connections therefrom to each of the collector electrode elements, a second electric conductor, connections therefrom to each of the emitter electrode elements.

9. The invention defined in claim 8, the said recesses in the body and the said inner wall surface areas of said electrode elements extending transversely and mutually parallelly across the surface of the body on the first recited broad side, the said transverse inner wall surfaces constituting the side walls of transverse, equally spaced parallel recesses opening toward said first recited broad side.

10. A junction transistor comprising a body of semiconductor material having opposite broad sides, the body having a plurality of recesses in one of its broad sides, each of said recesses having an inner surface area extending transversely to the geometric plane of said broad side, doping material, forming a p-n junction, in the areas of said body adjacent the transverse surfaces of the recesses, electrode material, forming hollowed out elements of a collector electrode, mounted in alternate recesses on the said inner transverse surfaces thereof, electrode material, forming hollowed out elements of an emitter electrode, mounted in alternate recesses on the inner transverse surfaces thereof, each of said elements having inner wall surface areas facing each other and extending transversely to the geometric plane of said broad side, a base electrode on the other broad side of the body, said other broad side being substantially planar, an electric conductor, connections therefrom to each of the collector electrode elements, a second electric conductor, connections therefrom to each of the emitter electrode elements.

11. A junction transistor comprising a body of semiconductor material having opposite broad sides, the body having a plurality of recesses comprising parallel grooves in one of its broad sides, each of said grooves having an inner surface area extending transversely to the geometric plane of said broad side, electrode material, forming hollowed out elements of a collector electrode, mounted in alternate grooves on the said inner transverse surfaces thereof, electrode material, forming hollowed out elements of an emitter electrode, mounted in alternate grooves on the inner transverse surfaces thereof, each of said elements having inner spaced apart wall surfaces facing each other and extending transversely to the geometric plane of said broad side, a base electrode on the other broad side of the body, said other broad side being planar, an electric conductor, connections therefrom to each of the collector electrode elements, a second electric conductor, connections therefrom to each of the emitter electrode elements, and doping material, forming a p-n junction, in the areas of said body adjacent the bottom of the grooves, the spacing between the grooves and between the bottoms of the grooves and the base electrode being in the order of magnitude of 100 microns.

12. A junction transistor comprising a body of semiconductor material having opposite broad sides, the body having a plurality of cup shaped recesses in one of its broad sides, each of said recesses having an inner surface area extending transversely to the geometric plane of said broad side, electrode material, forming hollowed out elements of a collector electrode, lining the alternate recesses on the said inner transverse surfaces thereof, electrode material, forming hollowed out elements of an emitter electrode, lining the alternate recesses on the inner transverse surfaces thereof, each of said lining elements having inner wall surfaces facing each other and extending transversely to the geometric plane of said broad side, a base electrode on the other broad side of the body, said other broad side being planar, an electric conductor, connections therefrom to each of the collector electrode elements, a second electric conductor, connections therefrom to each of the emitter electrode elements, and doping material, forming a p-n junction, in the areas of said body adjacent the bottoms of the recesses, the spacing between the recesses and between the bottoms of the recesses and the base electrode being in the order of magnitude of 100 microns.

13. The method of producing a junction transistor which comprises providing a flat semiconductor body, said body having edge surfaces and two opposite major, large area faces forming its broad sides and being of given conductance type, with surface recesses in one of its broad sides, simultaneously doping the inner surface areas of said recesses to convert the adjacent body zones to the opposite conductance type, lining said recesses by placing electrode metal upon said doped areas including the area portions transverse to the plane of said broad side, the electrodes being themselves recessed, and placing base-electrode metal upon the opposite broad side.

14. The method of producing a junction transistor which comprises providing a flat semiconductor body of given conductance type with recesses on one of its broad sides, simultaneously doping the inner surface areas of all recesses and the intermediate raised areas of said broad side to convert the adjacent body zones to the opposite conductance type, removing material from said raised areas to expose non-converted material of said body, placing directing-electrode metal upon said doped areas including the area portions transverse to the plane of said broad side, and placing base-electrode metal upon the other broad side.

15. The method of producing a junction transistor which comprises providing a flat semiconductor body of given conductance type with recesses on one of its broad sides, diffusing doping substance into the inner surface areas of said recesses to convert the adjacent body zones to the opposite conductance type, placing directing-electrode lining metal upon said doped areas including the area portions transverse to the plane of said broad side, and placing base-electrode metal upon the other broad side.

References Cited in the file of this patent

UNITED STATES PATENTS

| | | |
|---|---|---|
| 2,666,814 | Shockley | Jan. 19, 1954 |
| 2,714,183 | Hall et al. | July 26, 1955 |
| 2,721,965 | Hall | Oct. 25, 1955 |
| 2,728,034 | Kurshan | Dec. 20, 1955 |
| 2,764,642 | Shockley | Sept. 25, 1956 |
| 2,820,154 | Kurshan | Jan. 14, 1958 |
| 2,827,599 | Jochems | Mar. 18, 1958 |